Nov. 30, 1937. L. SIM 2,100,821
MACARONI TRIMMING AND DRYING APPARATUS
Filed Oct. 15, 1935 5 Sheets-Sheet 4

La Sim, INVENTOR
BY Victor J. Evans & Co.
ATTORNEY

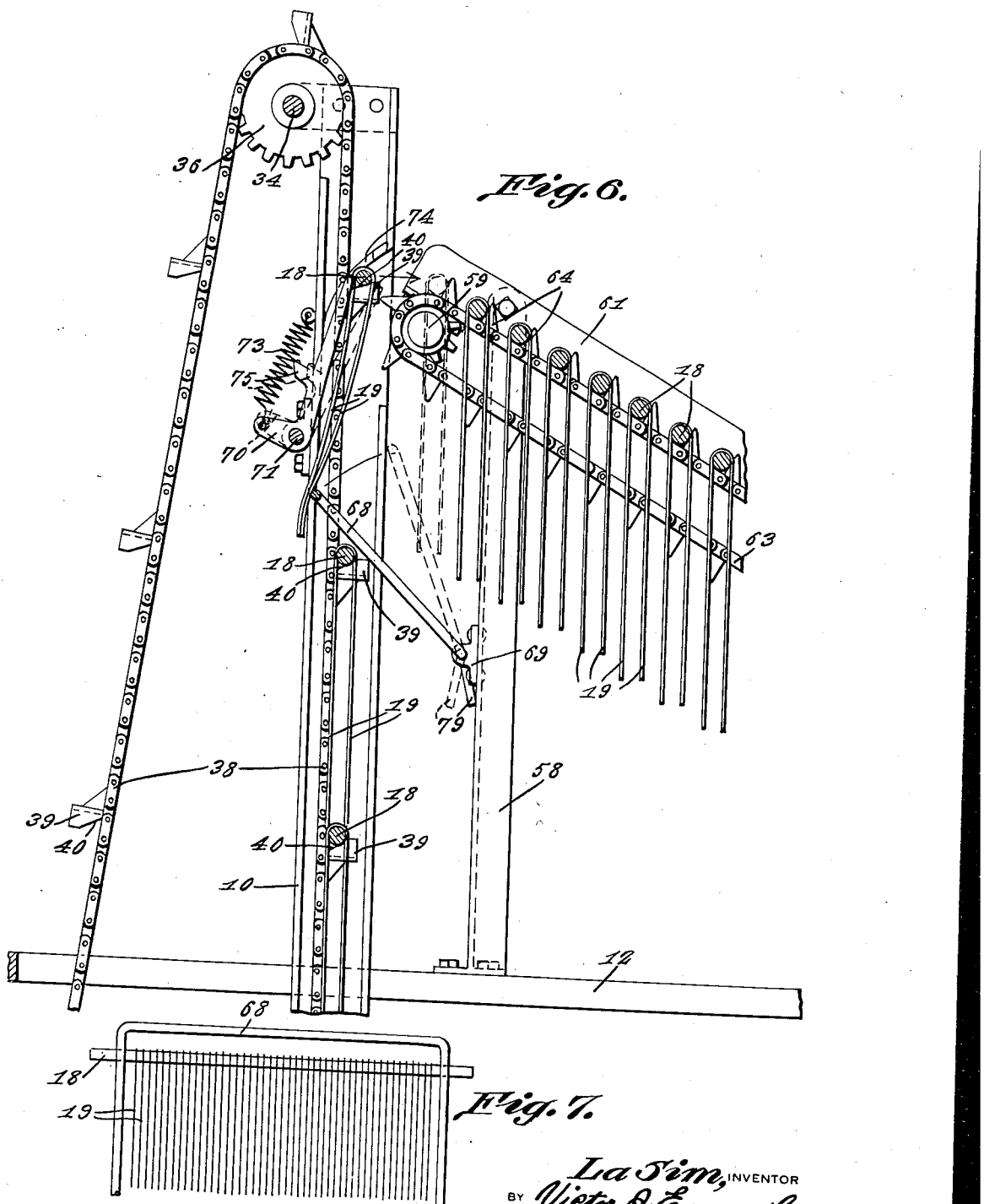

Patented Nov. 30, 1937

2,100,821

UNITED STATES PATENT OFFICE 2,100,821

MACARONI TRIMMING AND DRYING APPARATUS

La Sim, New Orleans, La.

Application October 15, 1935, Serial No. 45,159

7 Claims. (Cl. 198—20)

This invention relates to machines for making macaroni and spaghetti.

In the manufacture of macaroni and spaghetti the dough is extruded from press cylinders in the form of strings, and these strings are looped over rods in spaced relationship so that they do not stick together in handling.

An object of the invention is to provide a trimming and drying apparatus adapted to receive the rods with the dough strings thereon, trim the strings to the desired length, and transfer the trimmed strings vertically through one or more floors of the factory in contact with the atmosphere so that the strings are dried, and then deliver the product to be packed into boxes for shipment, the apparatus being automatic in operation from the time the rods loaded with the strings are manually placed in the machine to the time the macaroni or spaghetti is ready to be packed into boxes for shipment.

A further object is to provide a time saving, highly efficient, and automatic apparatus of the type described in which novel means will be employed for cutting the strings to the desired length while being fed into the vertical elevator.

A further object is to provide novel means for deflecting the strings during travel on the vertical elevator away from the strings passing along the delivery carrier, so that there will be no possibility of intermingling of the strings with consequent clogging of the machine at the point of departure from the vertical elevator to the delivery carrier.

A further object is to provide a device of this character having a novel kicker for effectively transferring the rods loaded with the dough strings from the vertical elevator to the delivery carrier.

A still further object is to provide an electrically operated alarm device which is energized when the delivery carrier is approximately two-thirds fully loaded.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 6 is a detail vertical section showing the operation of the deflector and the kicker in transferring the rods loaded with dough strings from the vertical elevator to the delivery carrier, and, Figure 7 is a front elevation of a rod loaded with dough strings in position for passing the deflector.

Figure 1:
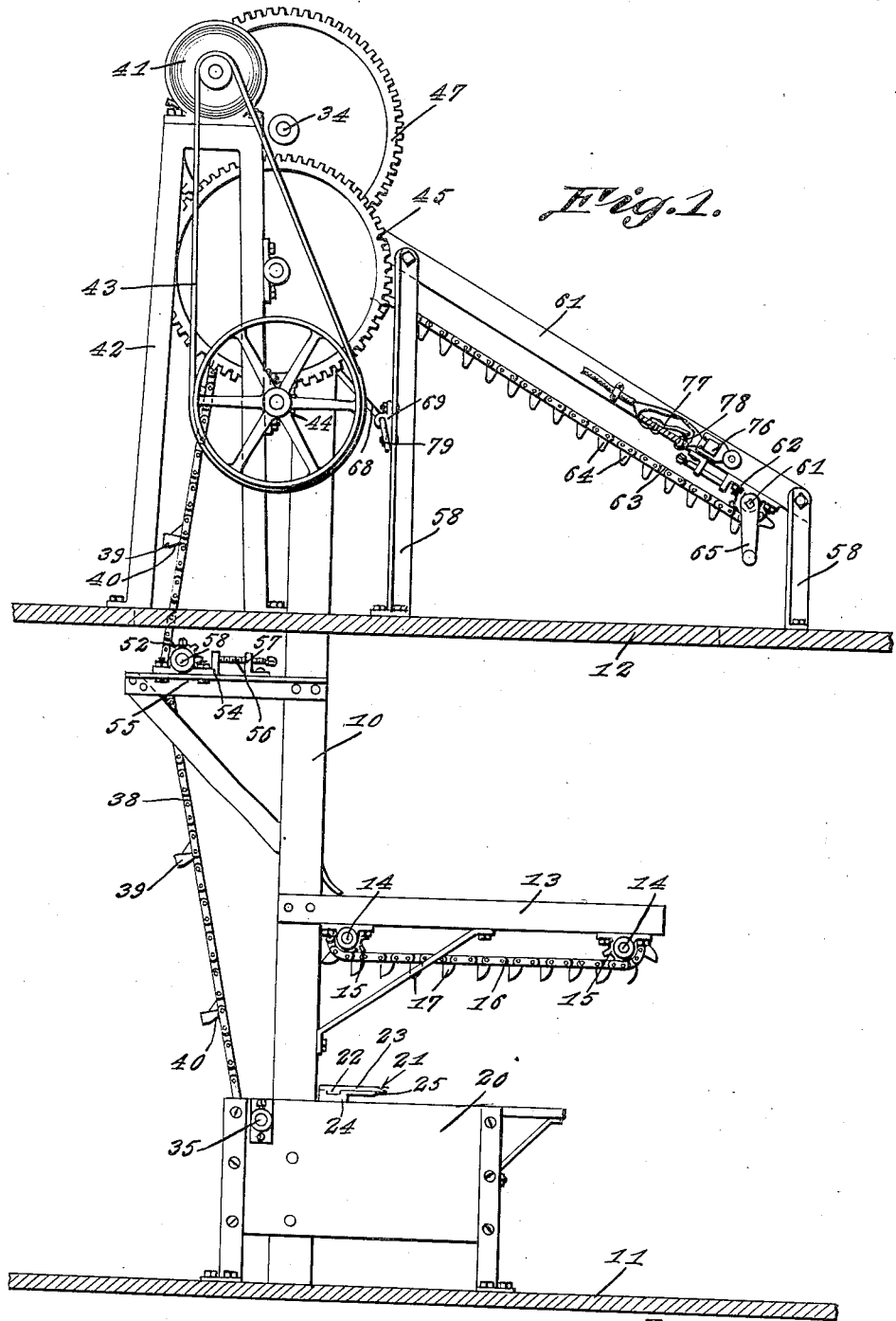
Figure 1 is a side elevation of a macaroni or spaghetti trimming and drying apparatus constructed in accordance with the invention.

Referring now to the drawings in which like characters of reference designate similar parts in the various views, 10 designates channeled vertical frame bars which may be bolted to the lower floor 11 of the factory and passed through the next floor 12 above and may be extended through as many floors as desired. A feed carrier is secured to the frame bars at a height to be conveniently loaded by the attendant and comprises parallel angle bars 13 which are bolted or otherwise secured at the rear ends to the frame bars. These bars support transverse endless carrier shafts 14 having sprockets 15 over which endless chains 16 are trained, the chains being provided with teeth 17 between which the rods 18 loaded with dough strings 19 looped thereover are placed, in uncut or untrimmed condition. The feed carrier is manually operated to feed the loaded rods toward the frame bars 10.

Figure 4:
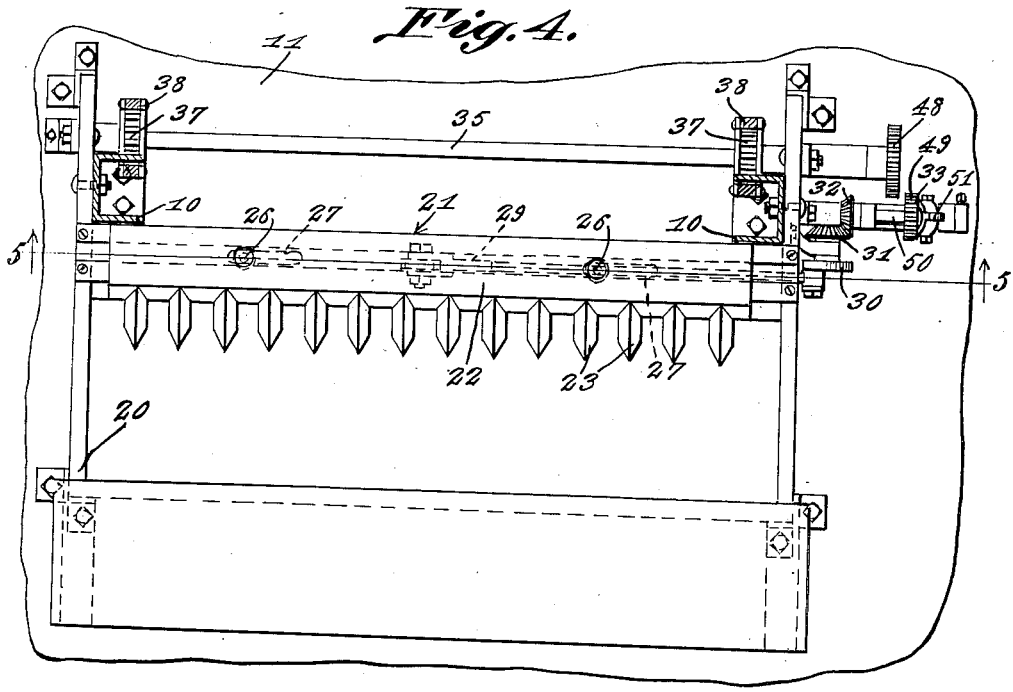
Figure 4 is a cross sectional view taken on the line 4—4 of Figure 2.

Below the feed carrier a bin 20 is arranged to receive the trimmings or waste, and a sickle bar 21 is disposed transversely of the top of the bin in front of the frame bars 10 in position to intercept the lower ends of the dough strings and trim the strings to a predetermined length. The sickle bar is of conventional type comprising an upper oscillating member 22 having sections 23, and a lower stationary member 24 having guide fingers 25 which coact with the sections in trimming the strings. The oscillating member is yieldably held against the stationary member by bolts 26 which pass through slots 27 in the stationary member and are equipped with pressure springs 28. A pitman 29 is operatively connected to the oscillating member, as shown in Figure 5, and is connected to a crank disk 30, as best shown in Figure 4, the disk being driven continuously by meshing beveled gears 31 and 32 which are in turn power driven through a clutch disk 33 from the vertical elevator about to be described.

Figure 3:
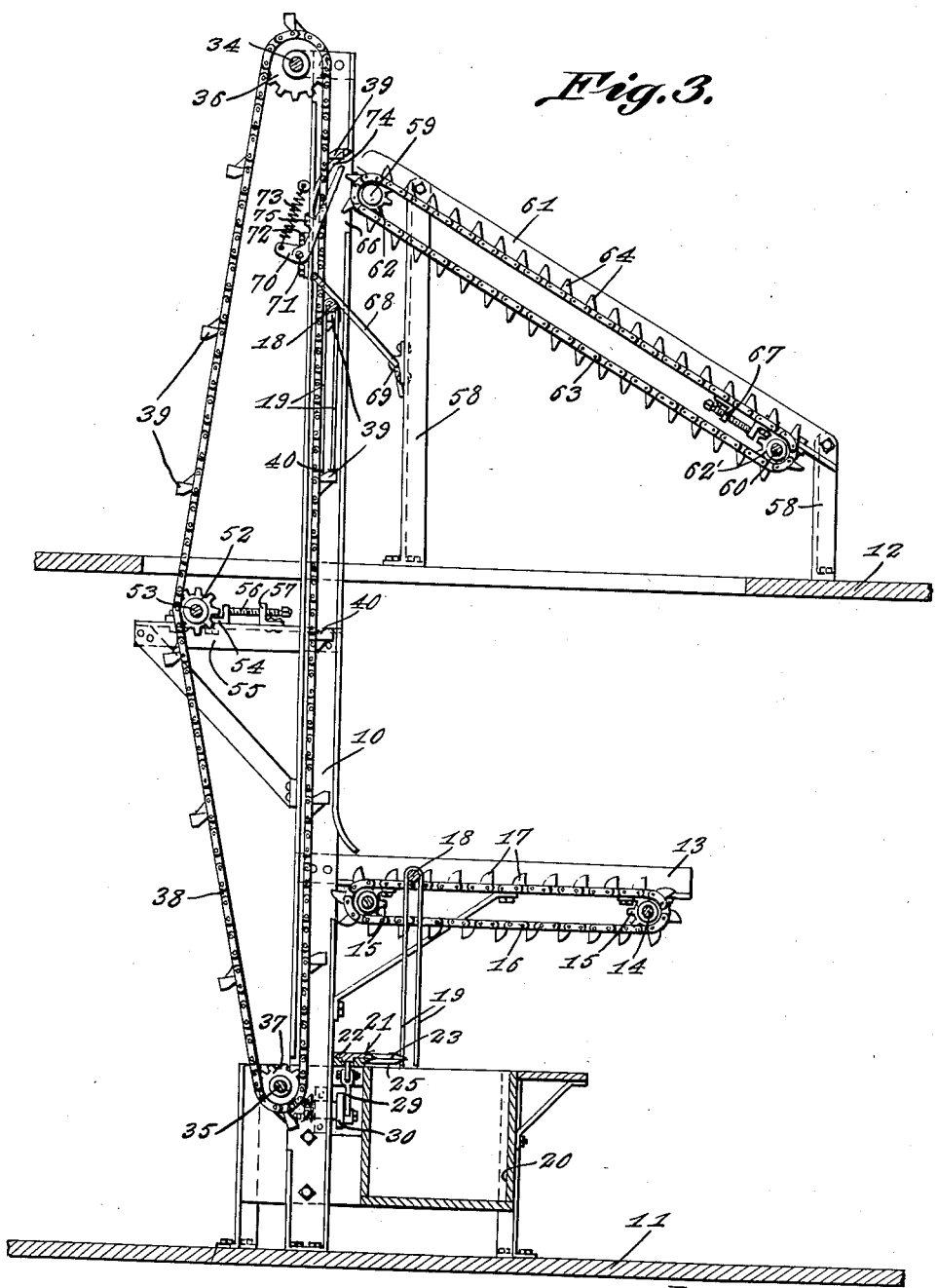
Figure 3 is a vertical section of the apparatus taken on the line 3—3 of Figure 2.

The vertical elevator comprises an upper and lower shaft 34 and 35 which are disposed transversely between the frame bars 10 and are equipped with spaced sprocket gears 36 and 37, as best shown in Figure 3. Endless carrier chains 38 are trained over the sprocket gears and the front reaches of the chains are embraced by the channel frame bars 10, as best shown in Figures 3, 4 and 6. At spaced intervals on the chains, lugs 39 are arranged and aligned transversely of the chains, each pair of the lugs receiving the ends of a respective rod 18 loaded with dough strings. The lugs are provided with rearwardly sloped upper faces 40 which hold the rods against the chains and prevent displacement of the rods, and the lugs are so spaced apart that the looped strings 19, trimmed to the desired length by the sickle bar during passage to the vertical elevator, will not interfere with the next lowermost loaded rod, as best shown in Figure 6.

Figure 2:
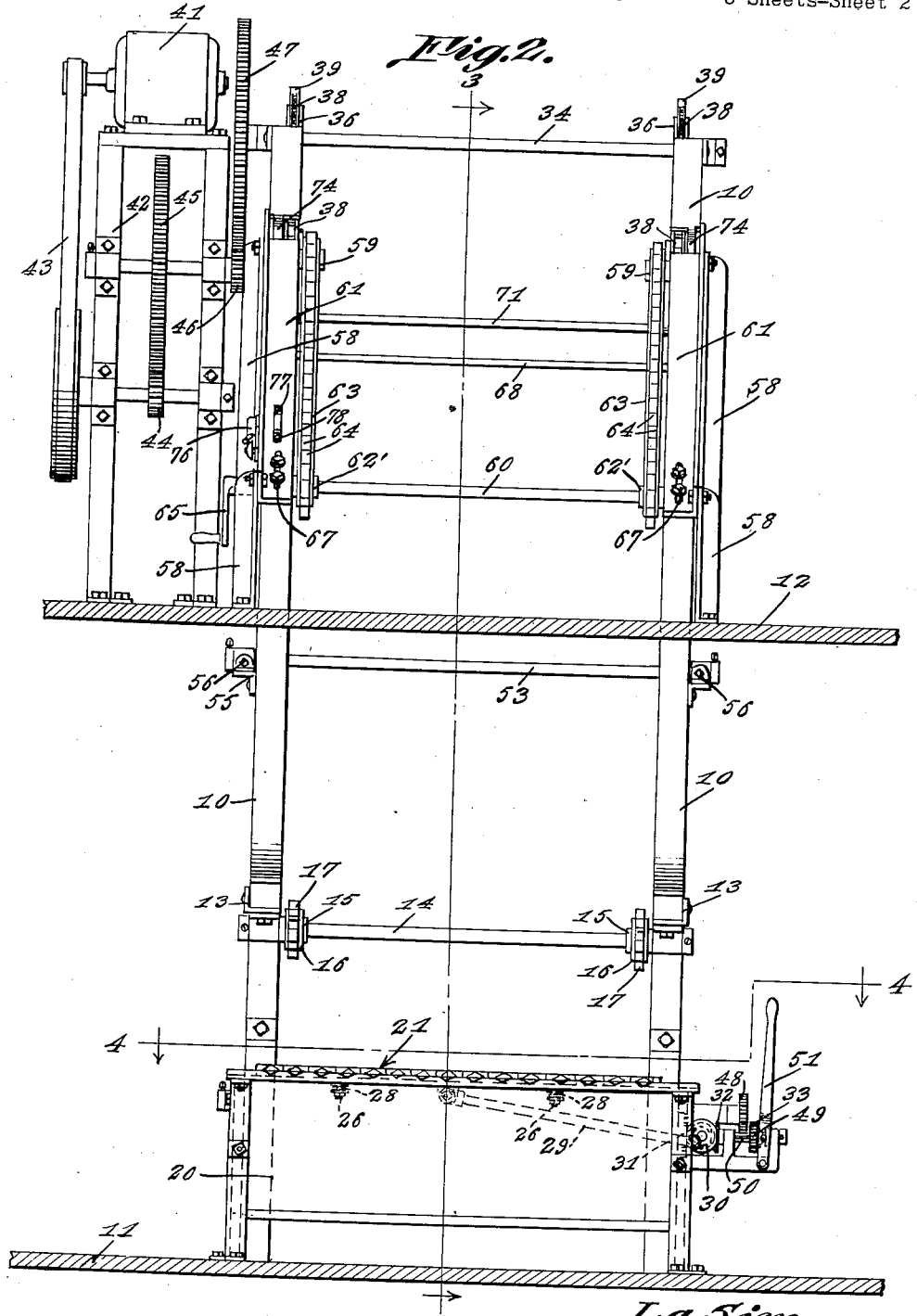
Figure 2 is a front elevation of the apparatus.

The vertical elevator is driven by means of a motor 41, best shown in Figure 2, and preferably the motor is supported upon a suitable frame 42 which may be bolted to the upper floor 12 and supports motion transmitting mechanism comprising a belt drive, 43, meshing gears 44 and 45, and meshing gears 46 and 47, the gears and belt drive being proportioned to form a reduction train, as will be understood, to reduce the speed of the motor shaft as applied to the last gear 47 of the train. Said gear 47 is connected to the upper shaft 34 of the vertical elevator and drives the elevator at a predetermined rate of speed.

Figure 5:
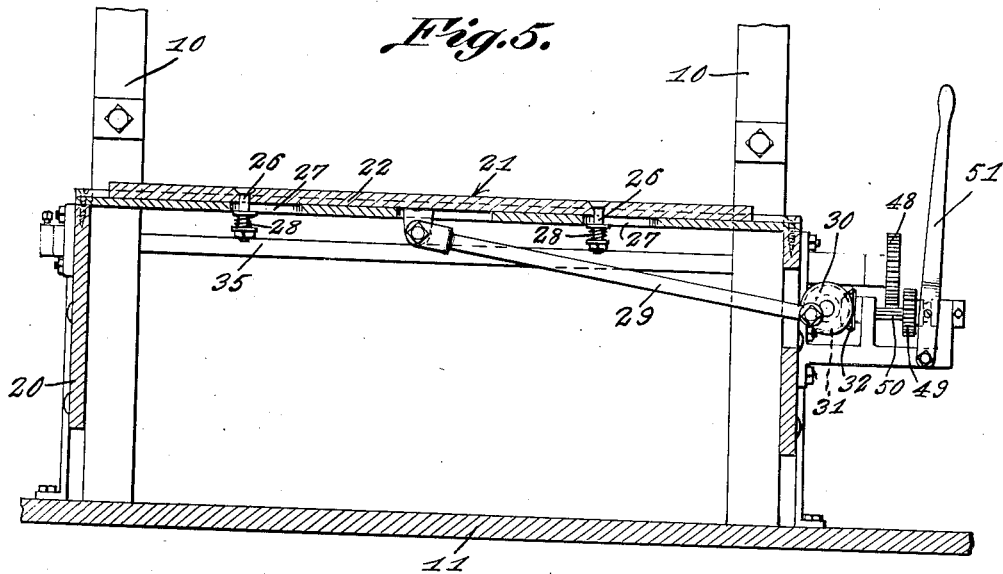
Figure 5 is a cross sectional view taken on the line 5—5 of Figure 3 showing the sickle bar and its actuating mechanism.

The lower shaft 35 of the elevator, as best shown in Figures 3 and 5, is equipped at one end with a gear 48 which meshes with a clutch gear 49 splined on a shaft 50 and operated by a shaft lever 51 to drive the sickle bar from the vertical elevator.

For tightening the vertical elevator chains, sprocket gears 52 engage the rear reaches of the chains and are mounted on a shaft 53 carried by bearings 54 which are slidably mounted on arms 55 that project rearwardly from the frame bars 10 and are moved by adjusting screws 56 which have threaded engagement with stationary brackets 57 on the arms 55.

A delivery carrier is mounted on suitable standards 58 on the upper floor 12 and slopes downwardly from the vertical elevator to within convenient reach of an attendant, and comprises upper stub shafts 59 and a lower shaft 60. The shafts are journaled in suitable bearings carried by angle sides bars 61 which connect the uprights 18. The stud shafts are equipped with sprocket gears 62 and the lower shaft 60 is equipped with sprocket gears 62'. Endless carrier chains 63 are trained over the sprocket gears and are equipped with lugs 64 against which the rods 18 loaded with dough strings are lodged after transfer from the vertical elevator. A crank handle 65 is fixed to one hand of the shaft 60 and may be manually rotated to actuate the delivery carrier when desired.

The delivery carrier, however, is automatically operated by the vertical elevator and for this purpose the lugs 64 of the delivery carrier chains project through openings 66 formed on the front flanges of the frame bars 10, into the path of the lugs 39 of the vertical elevator chains so that the lugs 39 impinge against the lugs 64 and impart step actuation to the delivery carrier.

Chain tighteners for the delivery carrier chains, similar to the chain tighteners of the vertical elevator are mounted on the bars 61 and are indicated in general by the numeral 67. Since the construction of the chain tighteners for the vertical elevator has already been described in detail, said description will suffice for the delivery carrier chain tighteners.

It is desirable that the dough strings on the rods traveling up the elevator be held spaced from the dough strings of the rods on the delivery elevator, and for this purpose a substantially U shaped deflector 68 is pivoted to swing in an arc from bearings 69 on the standards 58, as best shown in Figure 6. The legs of the deflector are of sufficient length to dispose the bight of the deflector rearwardly beyond the path of the loaded rods 18 on the vertical elevator so that the dough strings of a loaded rod which has just moved past the deflector will be pushed rearwardly and maintained in this position until the legs of the deflector are struck by the next succeeding loaded rod 18 whereupon the deflector is swung forwardly on its pivots by said next succeeding loaded rod to the position shown in dotted lines in Figure 6 to permit the preceeding loaded rod to be ejected onto the delivery carrier as will now be explained.

Just subsequent to the deflector arriving in the position shown in dotted lines in Figure 6 the transfer of each loaded rod 18 is made from the vertical elevator to the delivery carrier. To accomplish this purpose a pair of substantially L shaped kickers 70 are mounted at their elbows on a transverse shaft 71 which is journaled in suitable bearings 72 on the frame bars 10. Helical springs 73 are secured to the frame bars and to the short legs of the kickers to rock the kickers toward the delivery carrier, as shown in dotted lines in Figure 6. The long legs of the kickers project into the path of the loaded rods 18 and as each rod in sequence moves upwardly the kickers are pressed rearwardly by the rod against the tension of the springs 73 until the rod intercepts arcuate guide fingers 74 disposed opposite each other on the front flanges of the frame bars 10 whereupon the rod is guided forwardly toward the upper end of the delivery carrier by the arcuate guide flanges and at the same time the pressure of the long legs of the kickers move the rod 18 out beyond the sloped faces 40 of the lugs 39. Then, by the combined pressure of the kickers 70 and the curvature of the arcuate guide flanges 74 the rod is ejected from the vertical elevator to be intercepted by one of the advancing lugs 64 of the delivery carrier. The kickers are provided on their long legs with stop lugs 75 having the ends directed laterally to engage the rear flanges of the frame bars 10 and limit forward rocking movement of the long arms of the kickers under urge of the springs 73.

As best shown in Figure 1 an alarm device, preferably an electric bell 76, is mounted on the delivery carrier and is energized from any suitable source of electricity to sound an alarm when the delivery carrier is two-thirds loaded or is loaded to any desired extent. A circuit closure is disposed in the path of the rods 18 and preferably comprises a resilient switch contact 77 adapted to be depressed as a rod 18 on the loaded carrier progresses over the finger and makes contact with a fixed switch contact 78 to close the circuit to the alarm device. In the present embodiment the spring finger 77 is disposed adjacent to the delivery end of the delivery carrier so that when the carrier is two-thirds loaded the alarm will be sounded.

In operation the rods 18 loaded with spaced looped dough strings 19 are disposed on the feed carrier between the teeth 17 thereof and the carrier is then actuated to feed the rods toward the vertical elevator. As the rods near the elevator the ends of the dough strings 19 are intercepted and trimmed to a predetermined length by the sickle bar, the trimmings or waste dropping into the bin 20. The feed carrier delivers the loaded rods to the lugs 39 of the vertical elevator which elevates the rods successively into contact with the deflector 68. The deflector is pushed forwardly by each rod in succession until an angularly disposed stop 79 on the deflector engages the adjacent standard 58, and as each rod advances upwardly beyond the deflector the latter gravitates to initial position and presses rearwardly the dough strings 19 carried by the next lower loaded rod 18 and holds the strings away from the strings of the rods on the delivery carrier.

As each loaded rod 18 reaches the guide flanges 74 of the frame bars the kickers 70 eject the rod from the supporting lugs 39 of the vertical elevator onto the lugs 64 of the delivery carrier. After each rod is ejected from the elevator the delivery carrier is advanced a step by the elevator. The loaded rods 18 progress down the delivery carrier and are manually removed from the bottom of the carrier for packing and shipment. During the period of travel of the rods 18 loaded with dough strings 19 upon the feed carrier, upon the vertical elevator, and upon the delivery carrier, the dough strings will be exposed to the atmosphere and dried without the use of extraneous blowers or other apparatus.

From the above description it is thought that the construction and operation of the invention will be fully understood without further explanation.

What is claimed is:

1. Apparatus for handling and drying dough strings looped in spaced relation over rods, comprising an endless carrier for feeding the rods, an endless elevator receiving the rods from the endless carrier, an endless carrier for delivering the rods from the elevator, a deflector in the path of the rods on the elevator adapted to deflect the strings thereof away from the strings of the rods on the delivery carrier, and a kicker between the deflector and the delivery carrier for transferring the rods from the elevator to the delivery carrier.

2. Apparatus for handling and drying dough strings looped in spaced relation over rods, comprising an endless elevator receiving the rods, an endless carrier for delivering the rods from the elevator, a pivoted deflector extending transversely of the path of the rods on the elevator and deflecting the strings thereof away from the strings of the rods on the delivery carrier, the deflector being moved by one of the rods out of the path of the rods on the elevator as each rod progresses upwardly on the elevator beyond the deflector, and a pivoted spring pressed kicker on the elevator above the deflector for transferring the rods progressively to the delivery carrier.

3. Apparatus for handling and drying dough strings looped in spaced relation over rods, comprising an endless elevator receiving the rods, an endless carrier for delivering the rods from the elevator, a pivoted deflector in the path of the rods on the elevator for deflecting the strings thereof away from the strings of the rods on the delivery carrier, an arcuate guide flange on the elevator, and a pivoted spring pressed kicker on the elevator coacting with the guide flange in transferring the rods in sequence from the elevator to the delivery carrier.

4. Apparatus for handling and drying dough strings looped in spaced relation over rods, comprising an endless carrier for feeding the rods progressively, spaced uprights at the delivery end of the carrier, endless elevator chains carried by the uprights, lugs on the chains for engaging the rods, means for driving the chains to elevate the rods, endless delivery chains receiving the rods from the elevator chains, and lugs on the delivery chains disposed in the path of the lugs on the elevator chains and moved by the last named lugs to impart step actuation to the delivery chains.

5. Apparatus for handling and drying dough strings looped in spaced relation over rods, comprising an endless carrier for feeding the rods progressively, an endless elevator receiving the rods from the feeding carrier, an endless carrier for delivering the rods from the elevator, an alarm device actuated by the rods on the delivery carrier when the carrier is filled with the rods to a predetermined extent, a pivoted deflector in the path of the rods on the elevator for deflecting the strings away from the strings of the rods on the delivery carrier, and a kicker on the elevator for transferring the rods in sequence from the elevator to the delivery carrier.

6. Apparatus for handling and drying dough strings looped in spaced relation over rods, comprising an endless elevator for moving the rods progressively, an endless carrier for delivering the rods from the elevator, a U shaped deflector pivoted on the delivery carrier and projecting into the path of the rods on the elevator for holding the strings of the last named rods separated from the strings of the rods on the delivery carrier, and a stop on the deflector limiting pivotal movement of the deflector toward the elevator, the rods on the elevator engaging the legs of the deflector and swinging the deflector toward the delivery carrier to permit the rods on the elevator passing without obstruction from the elevator to the delivery carrier.

7. Apparatus for handling and drying dough strings looped in spaced relation over rods, comprising an elevator for moving and exposing the rods to the atmosphere, means for receiving the rods from the elevator, L shaped kickers pivoted on the elevator, springs operatively connected to the elevator and to the short legs of the kickers for rocking the long legs of the kickers toward said means to transfer the rods from the elevator to said means, and arcuate guide flanges disposed in the path of the rods on the elevator and guiding the rods in sequence from the elevator to said means during transfer of the rods by the kickers.

LA SIM.